(12) United States Patent
Yin et al.

(10) Patent No.: US 8,006,557 B2
(45) Date of Patent: Aug. 30, 2011

(54) MULTI-AXIS SENSOR

(75) Inventors: Luzhong Yin, Woburn, MA (US); Sandeep Akkaraju, Boston, MA (US); John Gardner Bloomsburgh, Cambridge, MA (US); Yie He, Andover, MA (US)

(73) Assignee: IntelliSense Software Corporation, Woburn, MA (US)

( * ) Notice: Subject to any disclaimer, the term of this patent is extended or adjusted under 35 U.S.C. 154(b) by 663 days.

(21) Appl. No.: 12/030,807

(22) Filed: Feb. 13, 2008

(65) Prior Publication Data

US 2008/0282801 A1 Nov. 20, 2008

Related U.S. Application Data

(60) Provisional application No. 60/938,374, filed on May 16, 2007.

(51) Int. Cl.
*G01P 15/00* (2006.01)
*G01P 15/125* (2006.01)

(52) U.S. Cl. ............... 73/514.01; 73/510; 73/514.29; 73/514.32

(58) Field of Classification Search ............ 73/510, 73/511, 514.32, 514.29, 514.01, 514.36, 73/514.38
See application file for complete search history.

(56) References Cited

U.S. PATENT DOCUMENTS

| | | | | |
|---|---|---|---|---|
| 4,996,878 A * | 3/1991 | Kubler | | 73/510 |
| 5,095,762 A * | 3/1992 | Holm-Kennedy et al. | | 73/862.041 |
| 5,723,790 A * | 3/1998 | Andersson | | 73/514.36 |
| 6,122,965 A * | 9/2000 | Seidel et al. | | 73/514.36 |
| 6,484,577 B1 * | 11/2002 | Bennett | | 73/514.26 |
| 6,826,960 B2 * | 12/2004 | Schaad et al. | | 73/514.29 |
| 6,829,937 B2 * | 12/2004 | Mahon | | 73/514.29 |
| 7,152,473 B1 | 12/2006 | Rushefsky et al. | | |
| 7,178,398 B2 * | 2/2007 | Stewart | | 73/514.01 |
| 7,178,401 B2 * | 2/2007 | Byrd | | 73/514.29 |
| 7,299,695 B2 * | 11/2007 | Tanaka et al. | | 73/510 |
| 7,325,454 B2 * | 2/2008 | Saito et al. | | 73/511 |
| 7,406,869 B2 * | 8/2008 | Jouanet et al. | | 73/510 |
| 2006/0174718 A1 | 8/2006 | Morimoto | | |

OTHER PUBLICATIONS

Watanabe, et al, SOI Micromachined 5-Axis Motion Sensor Using Resonant Electrostatic Drive and Non-Resonant Capacitive Detection Mode, Yamagata Research Institute of Technology, MEMS Laboratory, 2004.
Professor Mark Bachman, Gyroscopes, UCI EECS179: Lecture 10.
Vladislav Apostolyuk, Theory and Design of Micromechanical Vibratory Gyroscopes, MEMS/NEMS Handbook, Springer, 2006, vol. 1, pp. 173-195.

* cited by examiner

*Primary Examiner* — Helen C. Kwok
(74) *Attorney, Agent, or Firm* — DeMont & Breyer, LLC

(57) ABSTRACT

A method and apparatus for sensing accelerations directed along multiple directions are provided. An embodiment comprises a sensor array comprising two sensor pairs, each of which provides an output signal based on acceleration along two orthogonal directions. The sensor pairs are so that they collectively provide an output signal for each of three mutually orthogonal directions. In some embodiments, the sensor array is augmented to provide three additional signals, each of which is based on rotation about an axis aligned with one of the three orthogonal directions.

22 Claims, 11 Drawing Sheets

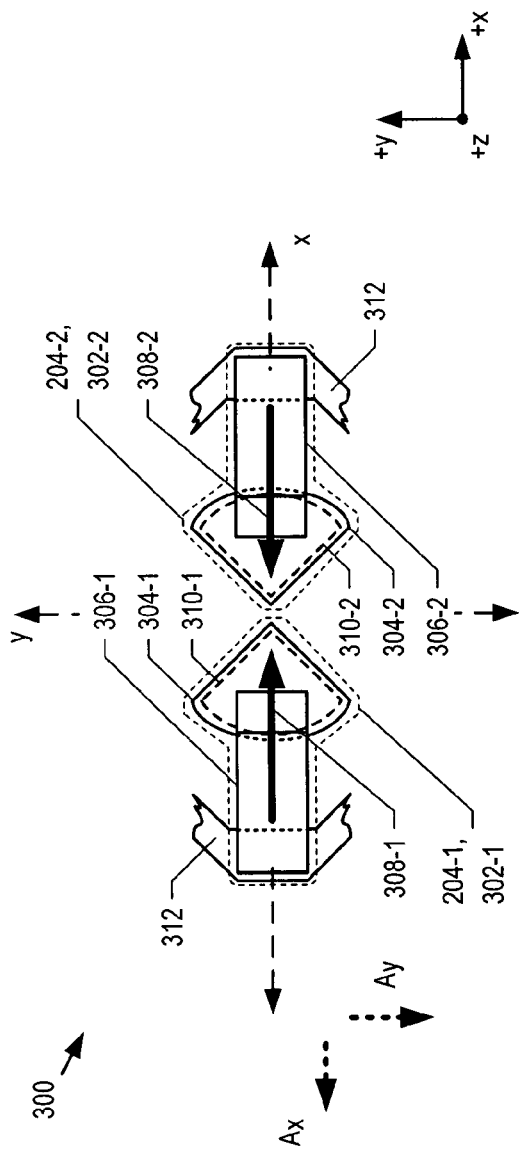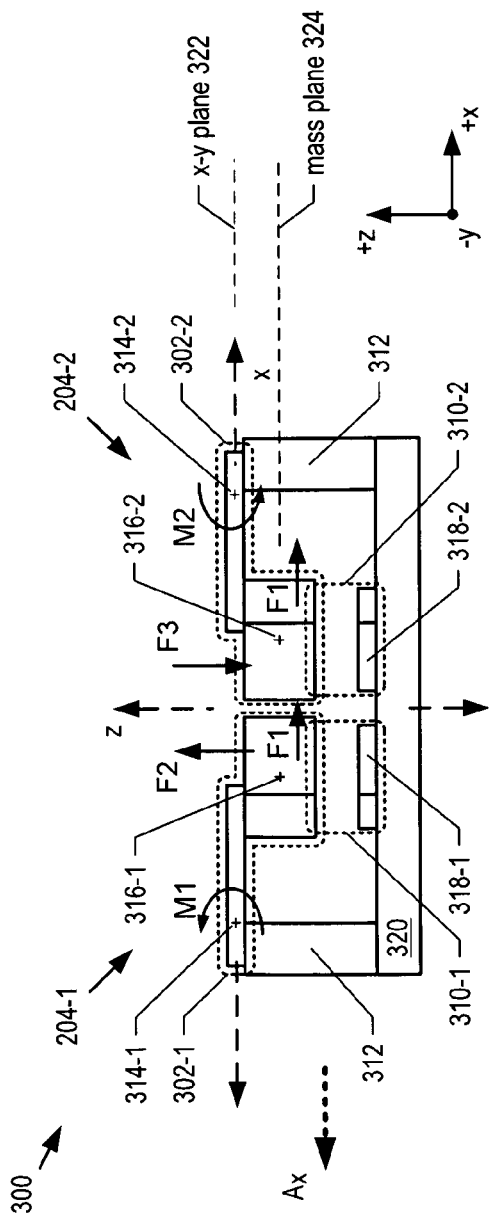

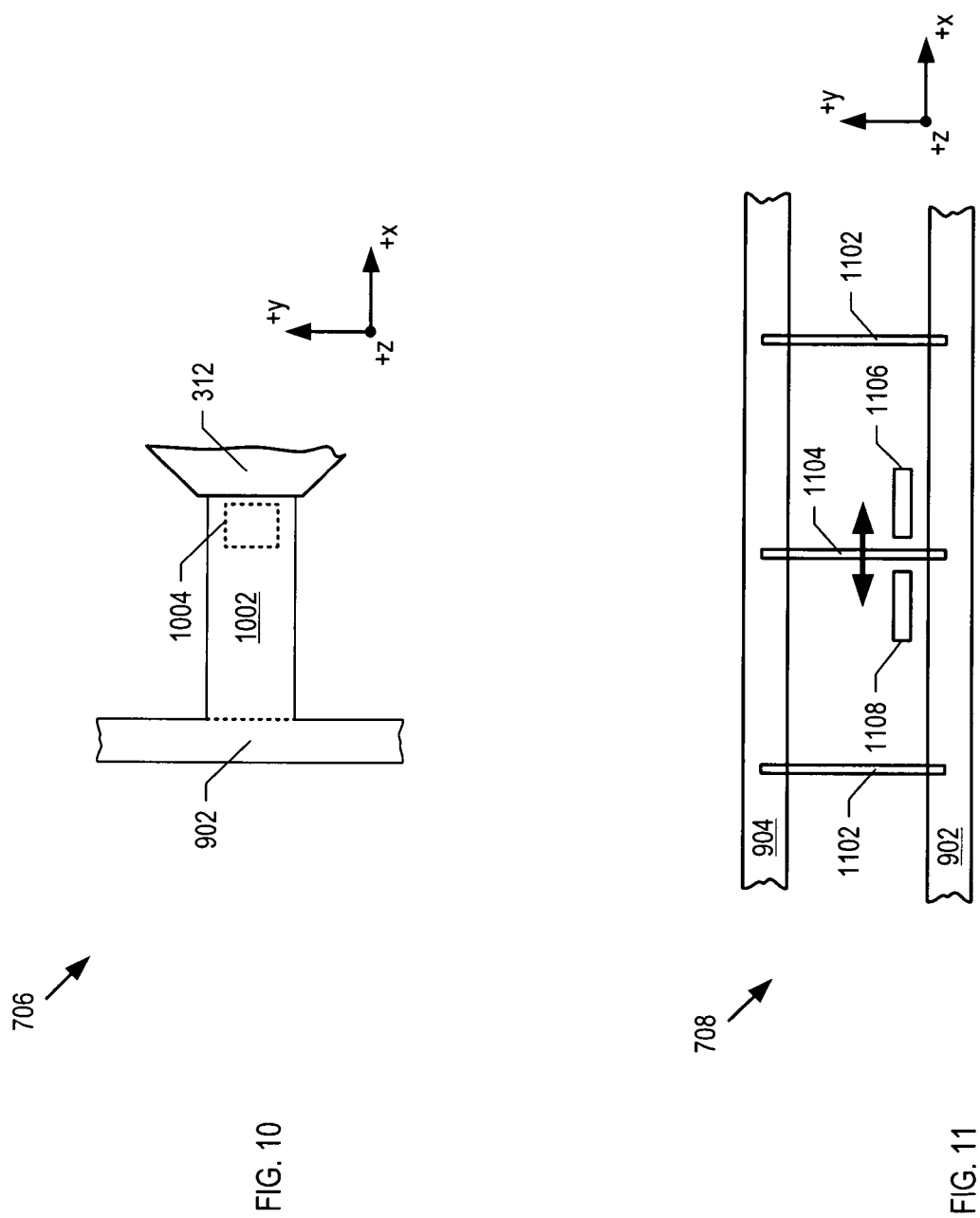

MULTI-AXIS SENSOR

CROSS REFERENCE TO RELATED APPLICATIONS

The underlying concepts, but not necessarily the language, of the following cases are incorporated by reference:

(1) U.S. Patent Application Ser. No. 60/938,374, filed 16 May 2007. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to acceleration sensors in general, and, more particularly, to inertial sensors.

BACKGROUND OF THE INVENTION

Inertial sensors are a vital navigation tool in modern transportation and military applications. In addition, inertial sensors are finding increased use in a wider range of applications, including automotive safety and control systems, video game controllers, and automobile navigation systems. Inertial devices are used to detect acceleration in one or more directions. They generally comprise an element that moves relative to another body, wherein the moving element moves in response to an acceleration. The movement of the moving element induces a variation of an electrical signal, which is provided a control circuit.

Recently, the use of MEMS technology has been proposed for inertial movement-detection sensors. MEMS inertial sensors comprise a mobile part and a fixed part, typically both of a conductive material (e.g., silicon and/or metal). In many cases, the mobile part comprises a suspended element that moves substantially linearly with respect to the fixed part in response to an acceleration. Often these parts are capacitively coupled so that a movement of the mobile part with respect to the fixed part brings about a capacitance variation that is detectable by an associated sense circuit.

Development of these devices, however, has primarily been focused on single-axis micro-gyroscopes and multi-axis accelerometers. Such prior-art sensors typically perform detection of the movement in one, or at the most two, preferential directions of detection. In order to detect movement in additional directions, it is necessary to replicate the sensor an appropriate number of times. This can lead to an increase in overall device size, higher cost, and increased sense circuit complexity. Such drawbacks have provided a barrier to the development and adoption of single-chip multi-axis inertial sensors.

A cost-effective, single-chip, multi-axis inertial sensor, therefore, would represent a significant advance in the state of the art.

SUMMARY OF THE INVENTION

The present invention enables detection of accelerations that are directed along multiple directions. Embodiments of the present invention are particularly well-suited for use in navigational systems and inertial sensing applications.

Embodiments of the present invention, like the prior art, monitor an acceleration along a first direction (e.g., the z-direction) by using a cantilever beam that has its longitudinal axis disposed orthogonally to the first direction (i.e., in an x-y plane). In some embodiments of the present invention, the cantilever beam comprises a mass disposed at its free end, and the motion of this mass along the z-direction is sensed using a mass position sensor. A cantilever beam and its associated mass position sensor collectively define a z-force sensor. The output of the z-force sensor is used to produce an output signal that is based on the acceleration along the z-direction.

Unlike the prior art, the present invention uses two cantilever beams, which operate as a sensor pair to provide a first signal based on acceleration along a first direction and a second signal based on acceleration along a second direction that is orthogonal to the first direction. Each cantilever beam comprises a mass whose center of mass is offset from the attachment point of the cantilever beam along the first direction. In addition, the cantilever orientations of the two cantilever beams are opposed to one another along the second direction. These two characteristics of the cantilever beams enable the sensor pair to provide the first and second signals.

In some embodiments, a sensor array comprising a first sensor pair and a second sensor pair is provided, wherein the alignment of the first sensor pair, second sensor pair, and the first direction are mutually orthogonal. In some embodiments, the first sensor pair is aligned along the x-axis and the second sensor pair is aligned along the y-axis. As a result, the two sensor pairs provide a first signal for acceleration along the z-direction, a second signal for acceleration along the x-direction, and a third signal for acceleration along the y-direction.

In some embodiments, a sensor pair is augmented with a first linear actuator that induced a first periodic motion of the sensor pair along a first direction that is orthogonal to a second direction along which the sensor pair is aligned. As a result of this first periodic motion, the sensor pair is enabled to provide a third signal that is based on a rotation of the sensor pair about an axis that is orthogonal to the first and second directions.

In some embodiments, a sensor array is augmented with a first linear actuator that induces a first periodic motion of the sensor array along a first direction that is orthogonal to a second and third direction, along which one of each of the sensor pairs of the sensor array is aligned. As a result, the sensor array is enabled to provide a fourth signal that is based on a rotation of the sensor array about an axis aligned with the second direction, and a fifth signal that is based on a rotation of the sensor array about an axis aligned with the third direction. In some of these embodiments, the sensor array is further augmented with a second linear actuator that induces a second periodic motion of the sensor array along one of the second and third directions. As a result, the sensor array is further enabled to provide a sixth signal that is based on a rotation about an axis aligned with the first direction.

An embodiment of the present invention comprises a method comprising: providing a first cantilever beam comprising a first mass, a first attachment point, and a first cantilever orientation, wherein the first mass has a first center of mass that is coplanar with a first plane, and wherein the first attachment point is coplanar with a second plane, and wherein the first plane and second plane are each substantially orthogonal to a first axis, and wherein the first plane and second plane are displaced on the first axis, and wherein the first cantilever orientation forms a first angle with a second direction that is aligned with a second axis that is orthogonal to the first axis, and further wherein the first angle is between 90 degrees and 270 degrees; providing a second cantilever beam comprising a second mass, a second attachment point, and a second cantilever orientation, wherein the second mass has a second center of mass that is coplanar with the first plane, and wherein the second attachment point is coplanar with the second plane, and further wherein the second cantilever orientation and the second direction form a second angle that is less than 90 degrees; sensing a first motion of the first mass along a first direction that is aligned with the first axis; and sensing a second motion of the second mass along the first direction.

BRIEF DESCRIPTION OF THE DRAWINGS

FIG. 3A depicts a schematic diagram of a top view of a pair of z-force sensors arranged in accordance with the illustrative embodiment of the present invention.

FIG. 3B depicts a schematic diagram of a cross-sectional view of a pair of z-force sensors arranged in accordance with the illustrative embodiment of the present invention.

FIG. 10 depicts a schematic diagram of details of a z-actuator in accordance with the first alternative embodiment of the present invention.

FIG. 11 depicts a schematic diagram of details of an x-actuator in accordance with the first alternative embodiment of the present invention.

DETAILED DESCRIPTION

The following terms are defined for use in this Specification, including the appended claims:
  mutually in-phase periodic motion means motion of two or more objects that is periodic with the same amplitude and frequency, wherein all of the objects move as one (i.e., the objects move in-phase with respect to one another).
  mutually out-of-phase motion means motion of two or more objects that do not move as one (i.e., the objects do not move in-phase with respect to one another)
  cantilever orientation means the direction from the attached end to the free end along the longitudinal axis of a cantilever beam.

Figure 1:
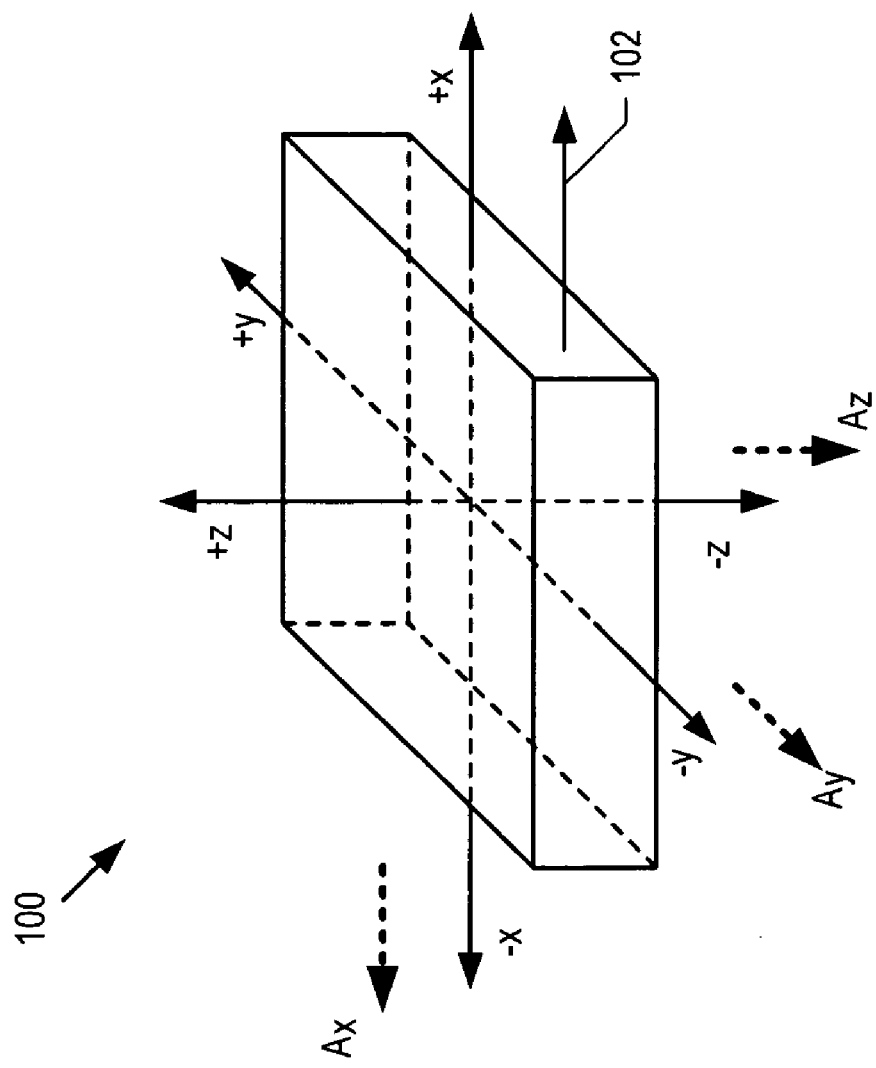
FIG. 1 depicts a perspective view of a multi-axis sensor in accordance with an illustrative embodiment of the present invention.

FIG. 1 depicts a perspective view of a multi-axis sensor in accordance with an illustrative embodiment of the present invention. Sensor 100 provides output signal 102, which comprises a signal for:
  i. linear acceleration of sensor 100 along the x-axis, $A_x$; or
  ii. linear acceleration of sensor 100 along the y-axis, $A_y$; or
  iii. linear acceleration of sensor 100 along the z-axis, $A_z$; or
  iv. any combination of i, ii, and iii.

It will be understood by one of ordinary skill in the art that the x, y, and z axes depicted in FIG. 1 represent any three mutually orthogonal axes and are meant to represent no specific orientation with respect to gravity, etc. It will also be understood that any general motion of sensor 100 can be described as a combination of linear accelerations along, and rotations about, the x, y, and z axes.

Figure 2:
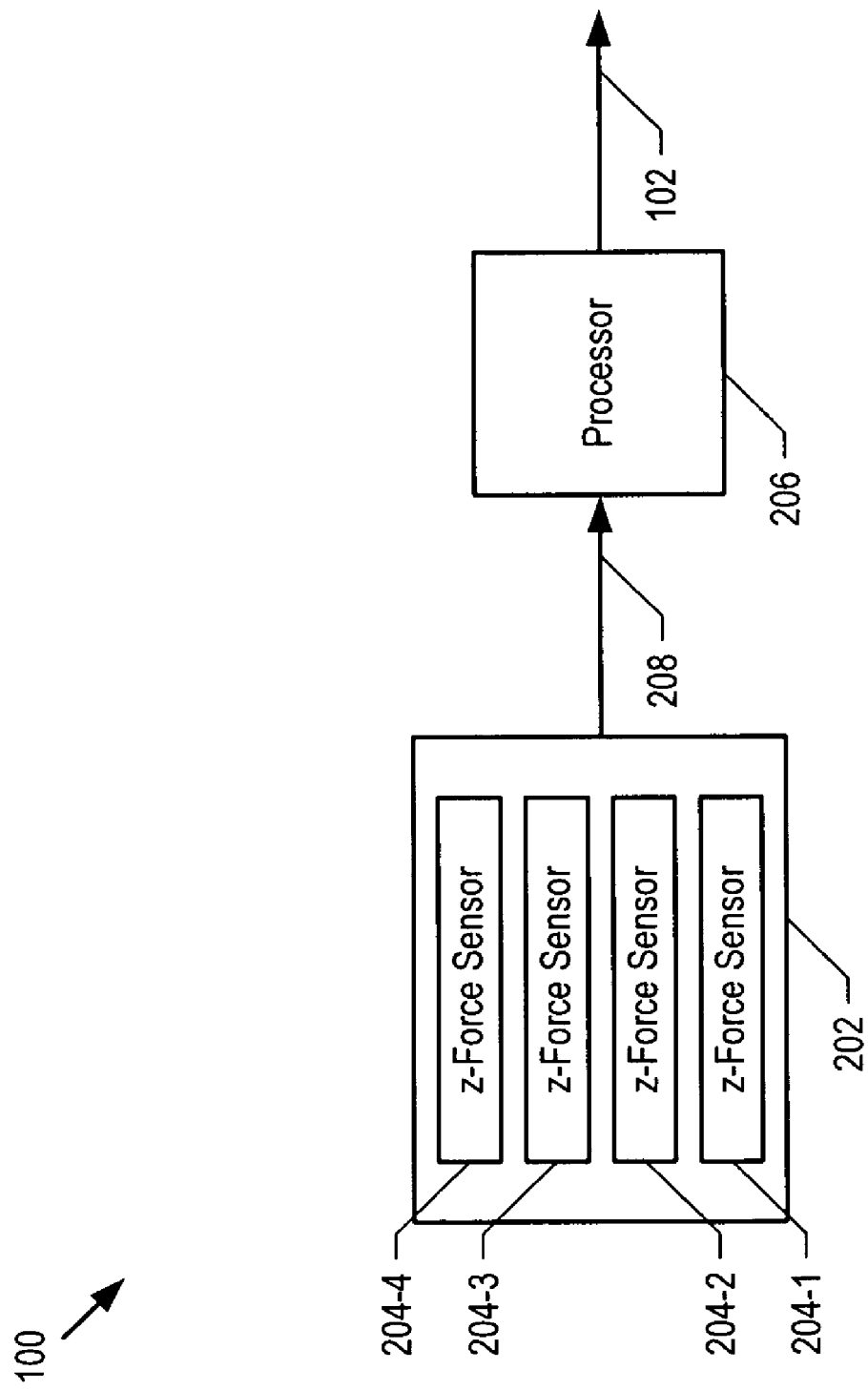
FIG. 2 depicts a block diagram of details of sensor 100 in accordance with the illustrative embodiment of the present invention.

FIG. 2 depicts a block diagram of details of sensor 100 in accordance with the illustrative embodiment of the present invention. Sensor 100 comprises sensor array 202 and processor 206. Sensor array 202 comprises z-force sensors 204-1, 204-2, 204-3, and 204-4 (referred to, collectively, as z-force sensors 204). As will be discussed in detail below, application of a force along the z-direction to a z-force sensor induces a motion of the sensor's mass along the z-direction. Each z-force sensor 204 provides an output based on the position and motion of its mass along the z-direction. Signals based on the output of z-force sensors 204 are provided to processor 206 on signal line 208. In some embodiments, signal line 208 comprises one or more signal lines for connecting each of z-force sensors 204 to processor 206.

Although in the illustrative embodiment sensor 100 comprises four z-force sensors, it will be clear to one of ordinary skill in the art, after reading this specification, how to make and use alternative embodiments of the present invention wherein sensor 100 comprises two z-force sensors, three z-force sensors, or more than four z-force sensors.

Operation of Multi-Axis Sensor 100 for Sensing Linear Accelerations

FIGS. 3A and 3B depict schematic diagrams of a top view and cross-sectional view, respectively, of a pair of z-force sensors arranged in accordance with the illustrative embodiment of the present invention. Sensor pair 300 comprises two z-force sensors, which are arranged to sense linear accelerations along two orthogonal directions, the x- and z-directions. The operation of sensor pair 300 is described here to explain the operating principle of the present invention regarding linear accelerations.

Two key characteristics of sensor pair 300 enable the detection of linear accelerations in both the x- and z-directions. The first characteristic is that each z-force sensor in sensor pair 300 is characterized by a mass asymmetry with respect to x-y plane, which is coplanar with the attachment point of each cantilever beam. In the case of sensor pair 300, this mass asymmetry manifests itself as the fact that, in their quiescent state, the centers of mass of masses 304 are coplanar with mass plane 324, which is offset from x-y plane 322 along the z-direction. Due to this mass asymmetry, acceleration of sensor pair 300 along the x-direction induces a force along the z-direction on each of the z-force sensors.

The second characteristic is that sensor pair 300 is arranged so that the two z-force sensors are aligned in at least partial opposition along the direction of their acceleration sensitivity. In other words, the cantilever orientations of the z-force sensors form an angle (within the x-y plane) that is between 90 degrees and 270 degrees. For the embodiment shown in FIGS. 3A and 3B, the cantilever orientations are aligned with the x-axis and form an angle that is approximately 180 degrees. Due to the fact that their cantilever orientations are in at least partial opposition with respect to the x-direction, when acceleration of sensor pair 300 along the x-direction induces z-directed forces on each of the z-force sensors, these forces are oppositely directed along the z-direction. This is described in more detail below.

It should be noted that the orientation of sensor pair along the x-axis was arbitrarily chosen and that orientation along the y-axis would enable detection of accelerations along the y- and z-directions in the same manner described here. It should also be noted that it is not necessary that the cantilever orientations form a 180 degree angle in order to sense acceleration along the x-direction. In fact, any angle of the cantilever orientations between 90 degrees and 270 degrees enables sensor pair 300 to sense acceleration along a direction within the x-y plane.

Sensor pair 300 comprises z-force sensor 204-1 and z-force sensor 204-2. Z-force sensor 204-1 comprises cantilever beam 302-1, which has cantilever orientation 308-1. Cantilever beam 302-1 comprises mass 304-1 and tether 306-1, wherein mass 304-1 is disposed at the free end of tether 306-1. Cantilever beam 302-1 is attached to rigid frame 312 at attachment point 314-1. In similar fashion, z-force sensor 204-2 comprises cantilever beam 302-2, which has cantilever orientation 308-2. Cantilever beam 302-2 comprises mass 304-2 and tether 306-2, wherein mass 304-2 is disposed at the free end of tether 306-2. Cantilever beam 302-2 is attached to rigid frame 312 at attachment point 314-2. A plane containing the x-axis and y-axis (i.e., x-y plane 322), is coplanar with attachment points 314-1 and 314-2.

Masses 304-1 and 304-2 (referred to, collectively, as masses 304) are blocks of single-crystal silicon, each having a thickness of approximately 20 microns. The thickness of masses 304 is selected to provide a desired sensitivity to accelerations that act upon it. Mass 304-1 has center of mass 316-1. Likewise, mass 304-2 has center of mass 316-2. In the absence of motion of sensor 100, (i.e., in its quiescent state), masses 304 are in a quiescent state. When in their quiescent state, the centers of mass of masses 304 are coplanar with mass plane 324. In other words, when neither of masses 304-1 and 304-2 is moving, their respective centers of mass 316-1 and 316-2 are coplanar with mass plane 324. Mass plane 324 is offset from x-y plane 322 by a distance along the z-axis that is suitable for providing sensor pair 300 with desired acceleration sensitivity.

Tethers 306-1 and 306-2 (referred to, collectively, as tethers 306) are beams of single-crystal silicon having a thickness of approximately 0.2 micron, a width of approximately 20 microns, and a length of approximately 80 microns. Tethers 306 are designed to provide a high resistance to deformation within the x-y plane and a low resistance to bending out of the x-y plane (i.e., along the z-direction). In other words, each of tethers 306 exhibits an in-plane stiffness that is higher than its out-of-plane stiffness. As a result, tethers 306 constrain motion of masses 304 within the x-y plane, but enable motion of masses 304 along the z-direction. In addition, the thicknesses of tethers 306 and masses 304 are selected to ensure that centers of mass 316-1 and 316-2 are offset along the z-direction from the x-y plane and attachment points 314-1 and 314-2.

Rigid frame 312 is a frame of substantially rigid material that resists deformation in all dimensions. Rigid frame 312 is an octagonal frame of single-crystal silicon having a thickness of approximately 30 microns. It will also be clear to those skilled in the art that the shape of rigid frame 312 can be other than octagonal and that rigid frame 312 can have a cross-sectional shape other than square.

Rigid frame 312 and z-force sensors 204-1 and 204-2 are operatively coupled so that accelerations $A_x$ and $A_y$ affect all of them in the same way. Rigid frame 312 provides a suitable separation between plate 320 and z-force sensors 204-1 and 204-2.

Rigid frame 312, tethers 306, and masses 304 are all electrically connected to a common potential (not shown for clarity). In some embodiments, this common potential is ground potential. In some embodiments, rigid frame 312, tethers 306, and masses 304 are not connected to the same electrical potential.

It should be noted that the illustrative embodiment represents merely one example of the present invention. It will be clear to one of ordinary skill in the art, after reading this specification, that embodiments of the present invention are suitable over a size scale that includes nano-scale devices, MEMS-scale devices, and macro-scale devices. For example, a suitable thickness of one or more of masses 304, tethers 306, and rigid frame 312 is within the range of 0.001 microns to many millimeters. It will be clear to those skilled in the art, that the dimensions of masses 304, tethers 306, and rigid frame 312 can be selected as any values that enable motion of masses 304 along the z-direction and desired performance of z-force sensors 204.

In addition, although the illustrative embodiment comprises a rigid frame, tethers, and masses that are formed from single-crystal silicon, it will be clear to those skilled in the art, after reading this specification, how to make and use alternative embodiments of the present invention wherein one or more of these elements comprises any suitable rigid material or materials. Suitable materials for use in masses 304, tethers 306, and rigid frame 312 include, without limitation, polycrystalline silicon, amorphous silicon, silicon compounds, graphite, oxides, nitrides, metals, polymers, carbon nanotubes, silicon carbide, and ceramics.

Plate 320 provides a rigid substrate on which electrodes 318-1 and 318-2 are disposed.

Electrode 318-1 and mass 304-1 collectively define sense capacitor 310-1. In similar fashion electrode 318-2 and mass 304-2 collectively define sense capacitor 310-2. Sense capacitors 310-1 and 310-2 provide electrical signals to processor 206 on signal line 204 (not shown for clarity). These electrical signals are based on the motion of masses 304-1 and 304-2, respectively.

Operation of sensor pair 300 is best understood through an example. In this example, sensor pair 300 is subjected to acceleration $A_x$, which is directed in the negative x-direction. As a result, force F1 is induced on each of masses 304-1 and 304-2. Force F1 is directed in the positive x-direction.

Tethers 306-1 and 306-2 constrain the motion of masses 304-1 and 304-2 within the x-y plane, relative to rigid frame 312. Because of the mass asymmetry of z-force sensors 204-1 and 204-2, however, force F1 induces bending moments M1 and M2 in tethers 306-1 and 306-2. Because of the fact that cantilever orientations 308-1 and 308-2 oppose each other along the x-direction, bending moments M1 and M2 are induced with opposite senses about their respective attachment points.

Bending moment M1, which is directed counter-clockwise about attachment point 314-1, induces force F2 on mass 304-1. Force F2 causes mass 304-1 to move in the positive z-direction, away from electrode 318-1. As a result, the capacitance of sense capacitor 310-1 is reduced.

In similar fashion, bending moment M2, which is directed clockwise about attachment point 314-2, induces force F3 on mass 304-2. Force F3 causes mass 304-2 to move in the negative z-direction, toward electrode 318-2. As a result, the capacitance of sense capacitor 310-2 is increased.

Acceleration of sensor pair 300 along the x-direction, therefore, is sensed as a difference in the magnitudes of the capacitance of sense capacitors 310-1 and 310-2.

When sensor pair 300 is accelerated along the z-direction, masses 304-1 and 304-2 will move equally in the same direction. Acceleration along the z-direction, therefore, is sensed as a uniform change in the magnitudes of the capacitance of both sense capacitors 310-1 and 310-2.

It should be noted that since tethers 306 resist in-plane motion of masses 304, acceleration of sensor pair 300 along the y-direction does not induce any motion of masses 304 along the z-direction. This is a direct result of the fact that z-force sensors 204-1 and 204-2 are directly opposed along the x-direction (i.e., cantilever orientations 308-1 and 308-2 form a 180 degree angle). In many applications, it is desirable that a z-force sensor pair be sensitive to acceleration along one direction in the x-y plane, but insensitive to acceleration along the orthogonal direction in the x-y plane. This attribute is referred to as "cross-axis immunity." The orientation of z-force sensors 204-1 and 204-2 depicted in FIGS. 3A and 3B, therefore, exhibits high cross-axis immunity.

Embodiments wherein cantilever orientations 308-1 and 308-2 form an angle either between 90 degrees and 180 degrees or between 180 degrees and 270 degrees, acceleration along the y-axis will induce some difference in the magnitudes of the capacitance of sense capacitors 310-1 and 310-2. Such embodiments will typically exhibit some amount of cross-axis sensitivity.

In some alternative embodiments, sensor pair 300 includes a second plate 320 that comprises a second pair of electrodes (i.e, upper electrodes). This second plate 320 is disposed above masses 304 using a spacer of a suitable thickness to ensure a gap between masses 304 and these upper electrodes. Each of these upper electrodes forms a second sense capacitor with one of masses 304. In these embodiments, therefore, the motion of each of masses 304 can be sensed using a differential pair of sense capacitors that comprises one of electrodes 318, one of masses 304, and one of the upper electrodes. For example, electrode 318-1, mass 304-1, and one upper electrode form one differential pair of sense capacitors for sensing the motion of mass 304-1.

Turning now to sensor 100, details of its structure and a method for sensing linear accelerations along three orthogonal axes are described.

Figure 4:
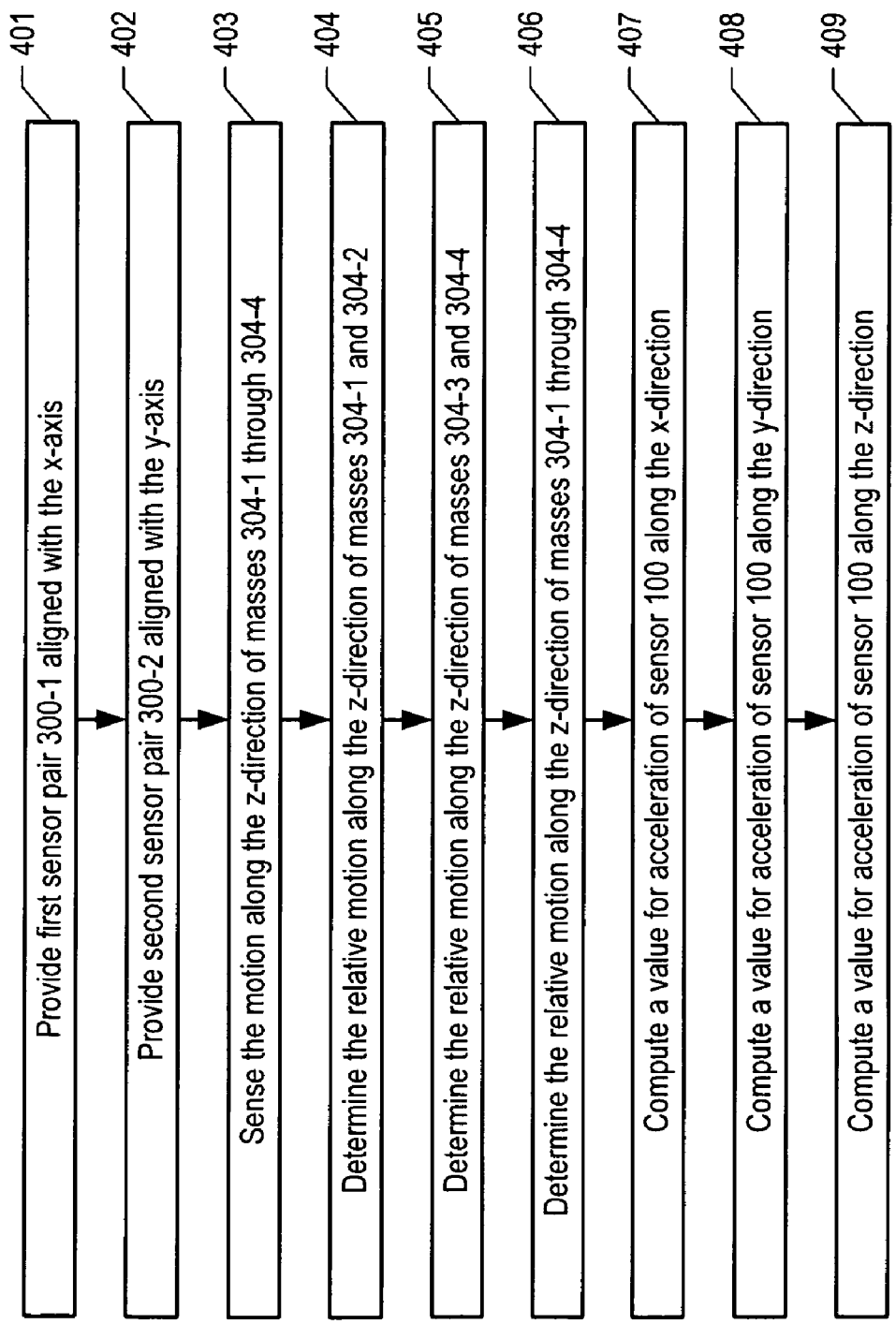
FIG. 4 depicts operations suitable for sensing linear accelerations along three orthogonal directions in accordance with the illustrative embodiment of the present invention.

FIG. 4 depicts operations suitable for sensing linear accelerations along three orthogonal directions in accordance with the illustrative embodiment of the present invention. FIG. 4 is described herein with reference to FIG. 5 and with continuing reference to FIGS. 3A and 3B.

Figure 5:
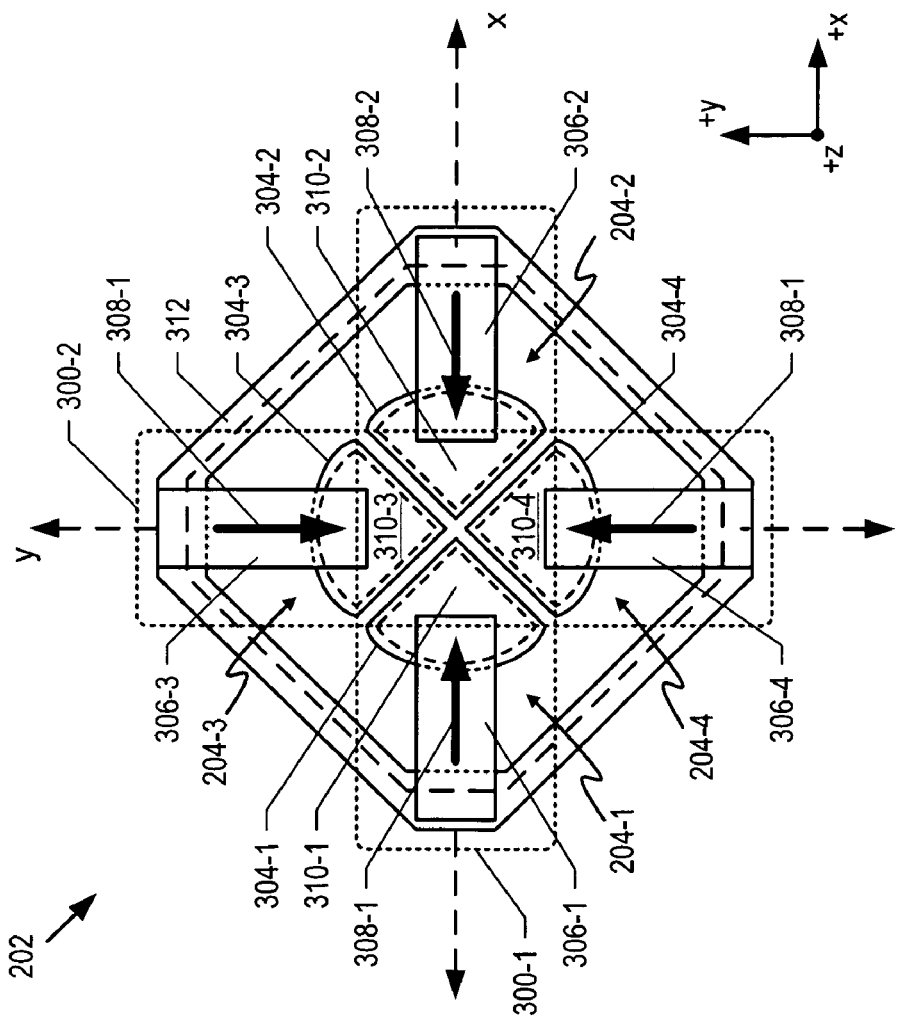
FIG. 5 depicts a schematic diagram of details of a multi-axis sensor suitable for sensing accelerations along three orthogonal directions in accordance with the illustrative embodiment of the present invention.

FIG. 5 depicts a schematic diagram of details of a multi-axis sensor suitable for sensing accelerations along three orthogonal directions in accordance with the illustrative embodiment of the present invention.

Method 400 begins with operation 401, wherein first sensor pair 300-1 is provided. First sensor pair 300-1 comprises z-force sensors 204-1 and 204-2, which are aligned in opposition along the x-axis. Due to its alignment along the x-axis, first sensor pair 300-1 detects accelerations along the x- and z-directions. Since z-force sensors 204-1 and 204-2 are in direct opposition along the x-axis, first sensor pair 300-1 is substantially insensitive to accelerations directed along the y-axis.

At operation 402, second sensor pair 300-2 is provided. Second sensor pair 300-2 comprises z-force sensors 204-3 and 204-4, which are aligned in opposition along the y-axis. Due to its alignment along the y-axis, second sensor pair 300-2 detects accelerations along the y- and z-directions. Since z-force sensors 204-3 and 204-4 are in direct opposition along the y-axis, second sensor pair 300-2 is substantially insensitive to accelerations directed along the x-axis. As a result, sensor array 202 provides sensitivity to accelerations along the x- y-, and z-directions, but simultaneously provides good cross-axis immunity since the accelerations along the x- and y-directions are detected using different sensors.

At operation 403, the z-direction motion of masses 304-1, 304-2, 304-3, and 304-4 is sensed by sense capacitors 310-1, 310-2, 310-3, and 310-4. Output signals from these capacitors are provided to processor 206 on signal line 208.

At operation 404, processor 206 determines the relative motion of masses 304-1 and 304-2 based on the output of sense capacitors 310-1 and 310-2.

At operation 405, processor 206 determines the relative motion of masses 304-3 and 304-4 based on the output of sense capacitors 310-3 and 310-4.

At operation 406, processor 206 determines the relative motion of masses 304-1 through 304-4 based on the output of sense capacitors 310-1 through 310-4.

At operation 407, processor 206 computes a value for acceleration of sensor 100 along the x-direction based on the relative motion of masses 304-1 and 304-2. The computed value for acceleration along the x-direction is based upon the out-of-phase motion along the z-direction of masses 304-1 and 304-2.

At operation 408, processor 206 computes a value for acceleration of sensor 100 along the y-direction based on the relative motion of masses 304-3 and 304-4. The computed value for acceleration along the y-direction is based upon the out-of-phase motion along the z-direction of masses 304-3 and 304-4.

At operation 409, processor 206 computes a value for acceleration of sensor 100 along the z-direction based on the relative motion of masses 304-1 through 304-4. The computed value for acceleration along the z-direction is based upon the in-phase motion along the z-direction of all four of masses 304-1 through 304-4. In some embodiments, the computed value of acceleration along the z-direction is based upon the in-phase motion along the z-direction of a sub-set of masses 304-1 through 304-4.

Figure 6:
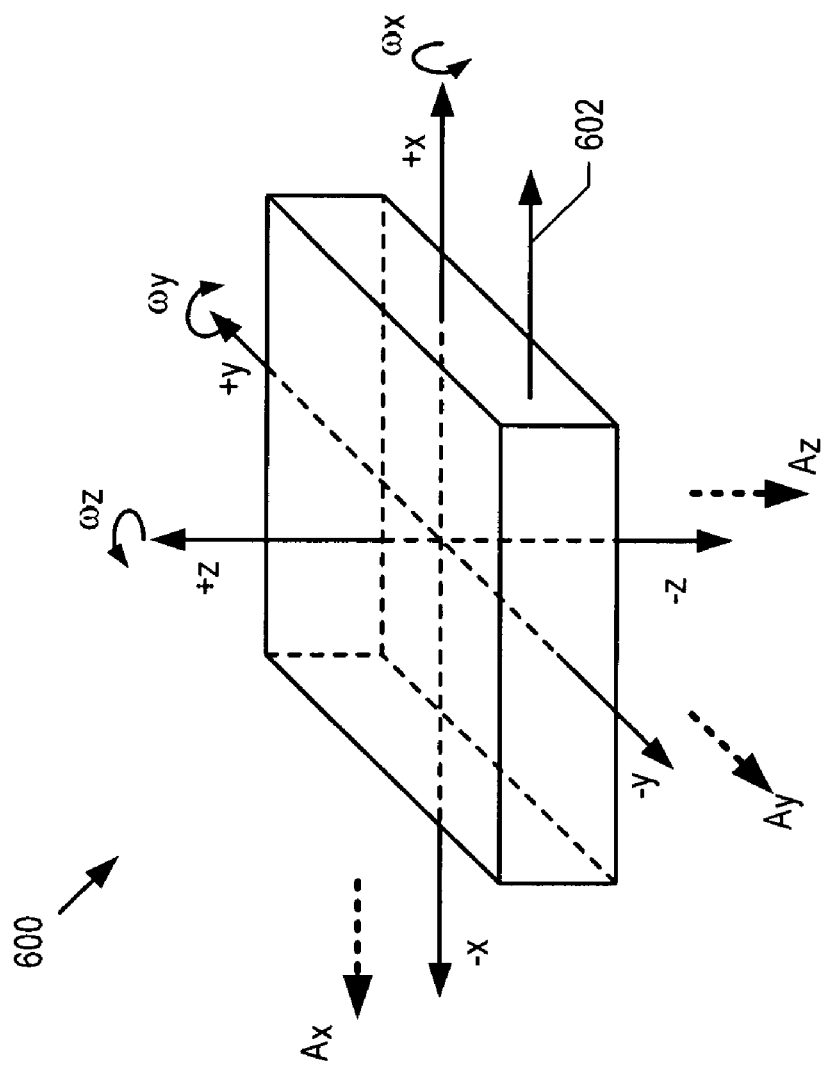
FIG. 6 depicts a perspective view of a multi-axis sensor in accordance with a first alternative embodiment of the present invention.

FIG. 6 depicts a perspective view of a multi-axis sensor in accordance with a first alternative embodiment of the present invention. Sensor 600 provides output signal 602, which comprises a signal for:

i. linear acceleration of sensor 600 along the x-axis, $A_x$; or
   ii. linear acceleration of sensor 600 along the y-axis, $A_y$; or
   iii. linear acceleration of sensor 600 along the z-axis, $A_z$; or
   iv. rotation of sensor 600 about the x-axis, $\omega_x$; or
   v. rotation of sensor 600 about the y-axis, $\omega_z$; or
   vi. rotation of sensor 600 about the z-axis, $\omega_z$; or
   vii. any combination of i, ii, iii, iv, v, and vi.

It will be understood by one of ordinary skill in the art that the x, y, and z axes depicted in FIG. 6 represent any three mutually orthogonal axes and are meant to represent no specific orientation with respect to gravity, etc. It will also be understood that any general motion of sensor 600 can be described as a combination of linear accelerations along, and rotations about, the x, y, and z axes.

Figure 7:
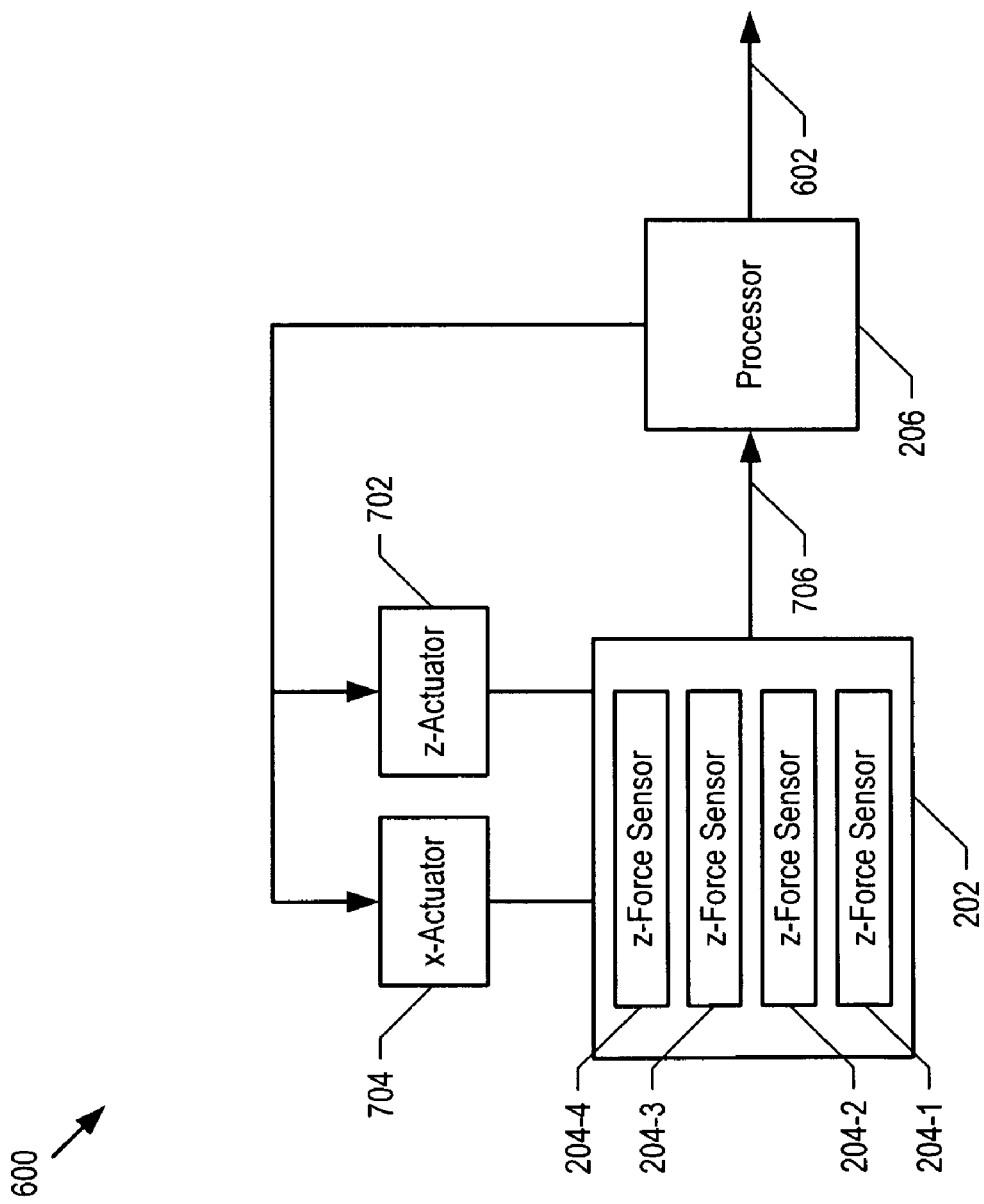
FIG. 7 depicts a block diagram of details of sensor 600 in accordance with the first alternative embodiment of the present invention.

FIG. 7 depicts a block diagram of details of sensor 600 in accordance with the first alternative embodiment of the present invention. Sensor 600 comprises sensor array 202, z-actuator 702, x-actuator 704, and processor 206. Signals based on the output of sensor array 202 are provided to processor 206 on signal line 706. In some embodiments, signal line 706 comprises one or more signal lines for connecting each of z-force sensors 204 to processor 206.

Although in the illustrative embodiment sensor 600 comprises four z-force sensors, it will be clear to one of ordinary skill in the art, after reading this specification, how to make and use alternative embodiments of the present invention wherein sensor 600 comprises two z-force sensors, three z-force sensors, or more than four z-force sensors.

Operation of Multi-Axis Sensor 600 for Sensing Rotations

The operation of multi-axis sensor 600 for sensing rotations about the x-, y-, and z-axes is explained herein with reference again to FIGS. 3A and 3B. As described above, sensor pair 300 comprises two z-force sensors, which are arranged to sense linear accelerations along two orthogonal directions, the x- and z-directions. In order to enable sensor pair 300 to sense rotations about the y-axis, a periodic motion along the z-direction is induced on the sensor pair by inducing this periodic motion to rigid frame 312.

Rigid frame 312 is moved along the z-axis with a first periodic motion that has a frequency approximately equal to the fundamental resonant frequency, $\omega_f$, of cantilevers 302-1 and 302-2. As a result, masses 304-1 and 304-2 each move with a first component of motion that is a periodic motion along the z-direction at the same frequency as the first periodic motion. In the absence of an acceleration or rotation of sensor 600, the masses move with amplitude $K_1$, which is based upon the geometry of the cantilever beams. The output signal of each of sense capacitors 310-1 and 310-2, due to the first periodic motion, therefore, can be described mathematically by the equation $S=K*\sin(\omega_f*t)$.

The operating principle of sensor 600 is founded on the fact that acceleration of masses 304-1 and 304-2 associated with a rotation about the y-axis will couple with their acceleration along the z-axis due to the first periodic motion. This coupling results in the addition of a second component to the motion along the z-axis of each of masses 304-1 and 304-2. This second component is also at the fundamental resonant mode of cantilevers 302-1 and 302-2. As a result, the output signal of each of sense capacitors 310-1 and 310-2 is based on a combination of the first and second components of motion along the z-direction. The output signal of each of sense capacitors 310-1 and 310-2 can be described mathematically as $S=K_1*\sin(\omega_f*t)+K_2*\sin(\omega_f*t+\phi)$, where $\phi$ is the relative phase of the second component of motion with respect to the phase of the first component of motion, and $K_2$ is the amplitude of the second component.

The fact that cantilever orientations 308-1 and 308-2 are in opposition along the x-axis means that a rotation about the y-axis results in the second component of motion couples to masses 304-1 and 304-2 with a relative phase difference of 180 degrees. In other words, the motion of masses 304-1 and 304-2 will be oppositely affected by a rotation of sensor 600 about the y-axis. As a result, a comparison of the output signals from sense capacitors 310-1 and 310-2 yields a mutually out-of-phase signal.

It should be noted that the orientation of sensor pair along the x-axis was arbitrarily chosen and that orientation along the y-axis would enable detection of rotation about the x-axis in the same manner described here.

The operating principle of sensor 300 can also be exploited to sense rotations about the z-axis by imparting a second periodic motion on sensor array 202 along any direction in the x-y plane. In the case of sensor 600, as described below and with respect to FIG. 9, this second periodic motion is induced along the x-direction.

Turning now to sensor 600, details of its structure and a method for sensing rotations about three orthogonal axes are described.

Figure 8:
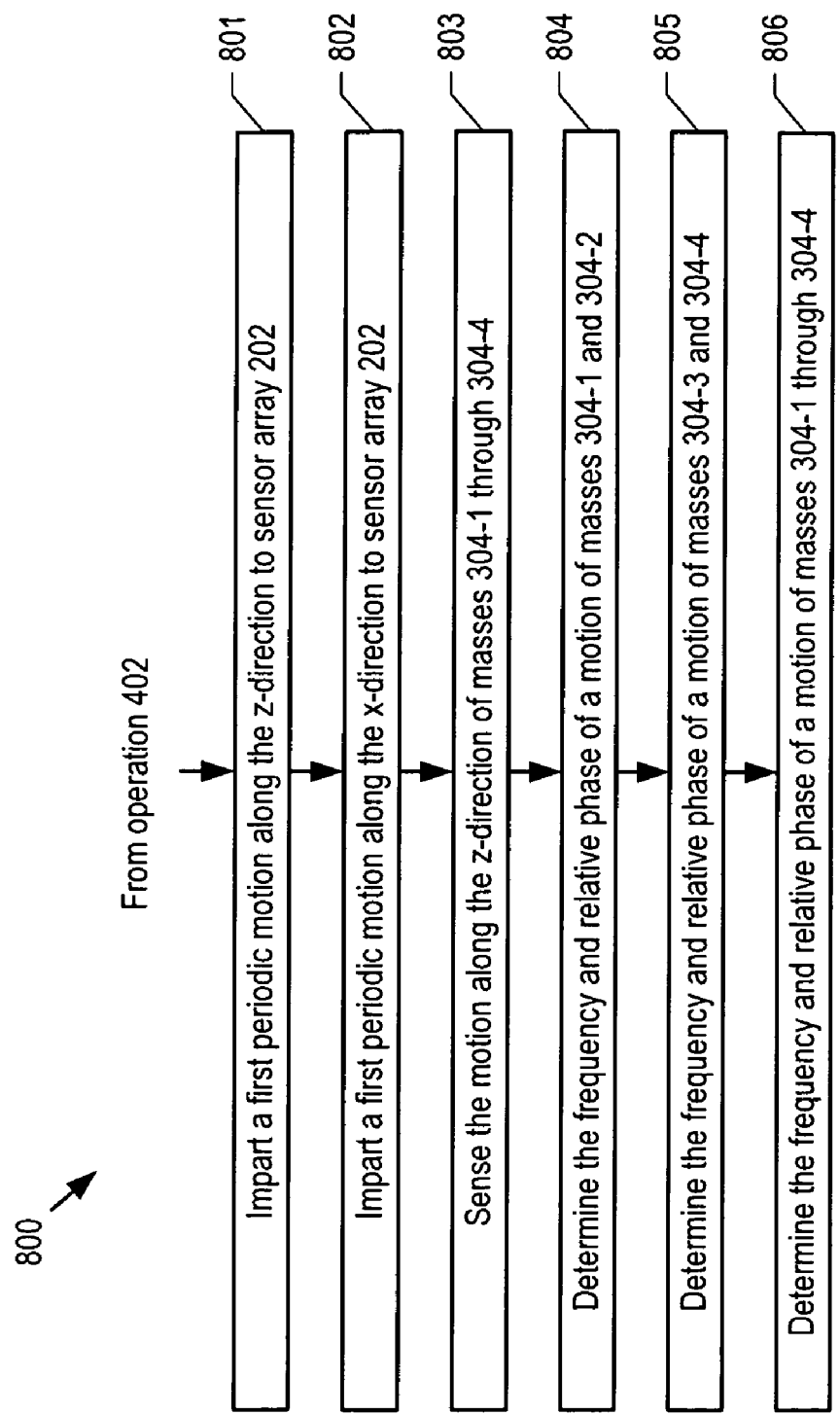
FIG. 8 depicts operations suitable for sensing rotations about three orthogonal directions in accordance with the first alternative embodiment of the present invention.

FIG. 8 depicts operations suitable for sensing rotations about three orthogonal directions in accordance with the first alternative embodiment of the present invention. FIG. 8 is described herein with reference to FIGS. 9, 10, and 11 and with continuing reference to FIGS. 3A and 3B.

Figure 9:
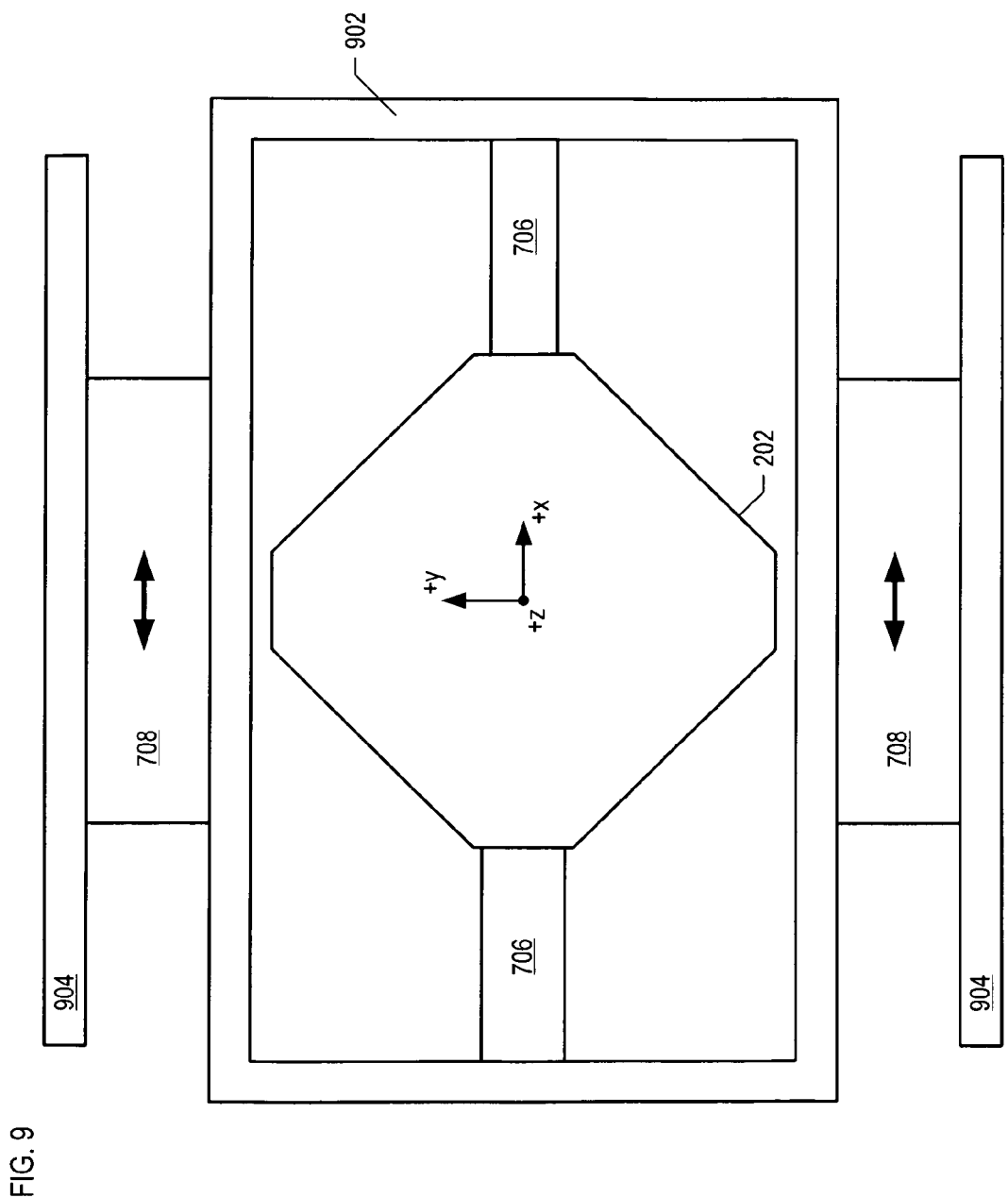
FIG. 9 depicts a schematic diagram of details of a multi-axis sensor in accordance with the first alternative embodiment of the present invention.

FIG. 9 depicts a schematic diagram of details of a multi-axis sensor in accordance with the first alternative embodiment of the present invention. Multi-axis sensor 600 comprises sensor array 202, z-actuators 706, x-actuators 708, rigid frame 902, and anchors 904.

Method 800 begins with operation 801, which follows operation 402 of method 400, described above and with respect to FIG. 4. At operation 801, z-actuator 706 imparts a first periodic motion along the z-direction to sensor array 202. Since sensor array behaves as a substantially rigid body, the first periodic motion is conveyed to z-force sensors 204. As described above, masses 304 move with a periodic motion in the z-direction in response to the first periodic motion imparted on sensor array 202. The frequency of the first periodic motion is selected to substantially match the resonant frequency of cantilever beams 302-1 through 302-4. As a result, the frequency of the periodic motion in the z-direction that is imparted on masses 304 is substantially the same as the first periodic motion. The amplitude of this periodic motion of masses 304, however, is typically larger than the amplitude of the first periodic motion and is based on the specific design of cantilever beams 302-1 through 302-4. In addition, in the absence of acceleration of sensor 600, masses 304 move in-phase with respect to one another.

Referring now to FIGS. 9 and 10, each of z-actuators 706 comprises tether 1002 and electrode 1004. Tether 1002 is a layer of single-crystal silicon that has a rectangular cross-sectional shape of 20 microns wide by 0.2 microns thick. Tether 1002 is electrically connected to a common potential (not shown for clarity). By virtue of its shape, tether 1002 resists deformation within the x-y plane, yet enables deformation out of the x-y plane. This out-of-plane deformation occurs by virtue of an electrostatic attractive force developed by z-actuator 706.

Z-actuator 706 is an electrostatic actuator that attracts tether 1002 toward underlying electrode 1004 upon application of sufficient voltage between them. Upon removal of the applied voltage, induced tension in tether 1002 provides a restoring force that enables z-actuator 706 to return to its undeflected state. By applying a periodic voltage function to z-actuator 706, a periodic motion along the z-direction is imparted to sensor array 202. It will be clear to those of ordinary skill in the art how to make and use z-actuator 706.

In some alternative embodiments, z-actuator 706 includes a second electrode disposed above tether 1002 to pull the tether in the direction away from electrode 1004.

At operation 802, x-actuator 708 imparts a second periodic motion along the x-direction on sensor array 202. Acceleration along the x-direction, due to the second periodic motion, couples with acceleration along the z-direction, due to the first periodic motion, to induce a periodic force along the z-direction on masses 304. In the absence of acceleration or rotation of sensor 600, this force induces a steady-state signal on each of the outputs of sensor capacitors 310-1 through 310-4.

Referring now to FIGS. 9 and 11, each of x-actuators 708 comprise tether 1102, tether 1104, and electrodes 1106 and 1108.

Each of tethers 1102 is a layer of single-crystal silicon that has a rectangular cross-sectional shape of 0.5 micron wide by 5 microns high. Tethers 1102 are electrically connected to a common potential (not shown for clarity). By virtue of their shape, tethers 1102 resist deformation within the y-z plane, yet enable deformation out of the y-z plane.

Tether 1104 is a layer of single-crystal silicon that has a rectangular cross-sectional shape of 0.5 micron wide by 5 microns high. Tether 1104 is electrically connected to a common potential (not shown for clarity). In some embodiments, rigid frame 902, tethers 1002, and masses 304 are not connected to the same electrical potential.

Electrodes 1106 and 1108 are individually addressable electrodes for applying an electrostatic force to tether 1104. When a voltage is applied between tether 1104 and electrode 1106, tether 1104 is pulled in the positive x-direction. Upon removal of this voltage and application of a voltage between tether 1104 and electrode 1108, tether 1104 is pulled in the negative x-direction. By alternating the voltages applied to electrodes 1106 and 1108, a periodic motion along the x-direction is imparted to a substantially rigid body that comprises rigid frame 902, z-actuators 706, and sensor array 202. In some embodiments, x-actuator 708 includes an electrode on only one side of tether 1104 and relies on tension that is developed in tether 1104 to provide a restoring force that enables periodic motion along the x-direction.

It will be clear to those skilled in the art, after reading this specification, that actuation of sensor array 202 can be provided along the y-direction instead of along the x-direction.

It should be noted that, although it is not required for the present invention, the fact that tethers 1002, 1102, and 1104 are designed to limit flexibility in only one dimension. Such tethers can improve the cross-axis immunity of sensor 600.

Although the illustrative embodiment comprises linear actuators that are electrostatic actuators, it will be clear to those skilled in the art, after reading this specification, how to make and use alternative embodiments of the present invention wherein at least one of z-actuator 706 and x-actuator 708 is a different type of linear actuator. Suitable actuators for use in sensor 600 include, without limitation, electromagnetic actuators, thermal actuators, piezoelectric actuators, magneto-restrictive actuators, fluidic actuators, hydraulic actuators, and pneumatic actuators.

At operation 803, each of sense capacitors 310-1 through 310-4 senses the motion of masses 304-1 through 304-4, respectively. The output signals of sense capacitors 310-1 through 310-4 are provided to processor 206 on signal line 706.

At operation 804, processor 206 compares the output signals from sense capacitors 310-1 and 310-2 and determines the frequency and relative phase of motion along the z-direction of masses 304-1 and 304-2. Processor 206 also computes a value for the rotation of sensor 600 about the y-axis. The computed value for rotation about the y-axis is based upon the frequency and relative phase of the motion along the z-direction of masses 304-1 and 304-2.

At operation 805, processor 206 compares the output signals from sense capacitors 310-3 and 310-4 and determines the frequency and relative phase of motion along the z-direction of masses 304-3 and 304-4. Processor 206 also computes a value for the rotation of sensor 600 about the x-axis. The computed value for rotation about the x-axis is based upon the frequency and relative phase of the motion along the z-direction of masses 304-3 and 304-4.

At operation 806, processor 206 compares the output signals from sense capacitors 310-1 through 310-4 and determines the frequency and relative phase of motion along the z-direction of masses 304-1 through 304-4. Processor 206 also computes a value for the rotation of sensor 600 about the z-axis. The computed value for rotation about the z-axis is based upon the frequency and relative phase of the motion along the z-direction of masses 304-1 through 304-4.

Figure 12:
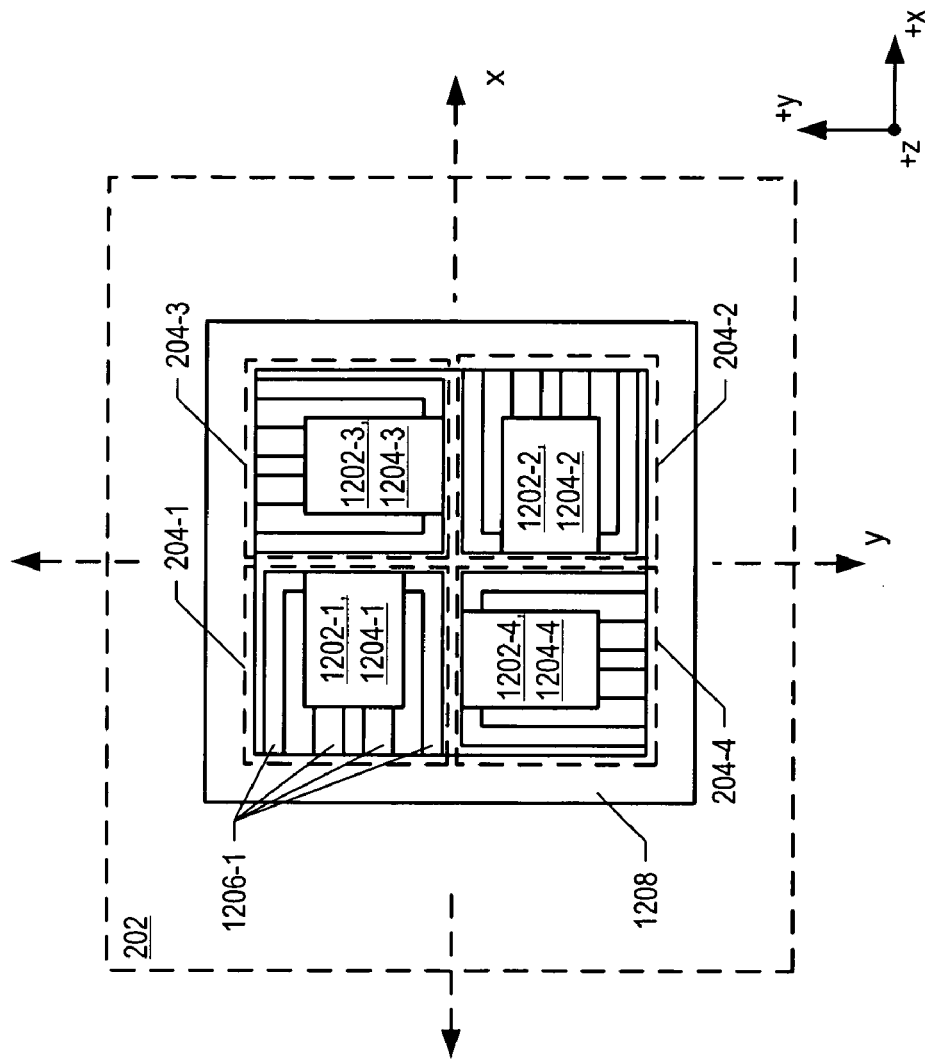
FIG. 12 depicts a schematic diagram of details of a sensor array in accordance with a second alternative embodiment of the present invention.

FIG. 12 depicts a schematic diagram of details of a sensor array in accordance with a second alternative embodiment of the present invention. Sensor array 202 comprises z-force sensors 204-1 through 204-4, which are arranged as two pairs of z-force sensors, one pair aligned with the x-direction (i.e., z-force sensors 204-1 and 204-2), and the other pair aligned with the y-direction (i.e., z-force sensors 204-3 and 204-4). The z-force sensors within each pair are directly opposed with one another along their direction of alignment, although they are not collinear.

In the illustrative embodiment, each of Z-force sensors 204 comprises a mass that supported from rigid frame 1208 by means of a tether. Each z-force sensor 204 further comprises an underlying electrode that, with its associated mass, collectively defines a sense capacitor for sensing the position of the mass along the z-direction. For example, z-force sensor 204-1 comprises mass 1202-1, which is supported from rigid frame 1208 by tether 1206-1. The position of mass 1202-1, along the z-direction, is sensed via sense capacitor 1204-1. Rigid frame 1208 is analogous to rigid frame 312. In addition, tethers 1206, like tethers 304, are designed to limit deformation within the x-y plane yet enable deformation out of the x-y plane.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   providing a first cantilever beam comprising a first mass, a first attachment point, and a first cantilever orientation, wherein the first mass has a first center of mass that is coplanar with a first plane, and wherein the first attachment point is coplanar with a second plane, and wherein the first plane and the second plane are each substantially orthogonal to a first axis, and wherein the first plane and the second plane are displaced on the first axis, and wherein the first cantilever orientation forms a first angle with a second direction that is aligned with a second axis that is orthogonal to the first axis, and further wherein the first angle is between 90 degrees and 270 degrees;
   providing a second cantilever beam comprising a second mass, a second attachment point, and a second cantilever orientation, wherein the second mass has a second center of mass that is coplanar with the first plane, and wherein the second attachment point is coplanar with the second plane, and further wherein the second cantilever orientation and the second direction form a second angle that is between −90 degrees and 90 degrees;
   sensing a first motion of the first mass along a first direction that is aligned with the first axis;
   sensing a second motion of the second mass along the first direction;
   imparting a first periodic motion along the first direction on each of the first mass and the second mass; and
   comparing the first motion and the second motion.

2. The method of claim 1 further comprising:
   providing the first cantilever beam such that the first angle is approximately 180 degrees; and providing the second cantilever beam such that the second angle is approximately zero degrees.

3. The method of claim 1 further comprising:
determining the frequency and phase of the first motion;
determining the frequency and phase of the second motion; and
comparing at least one of the frequency and phase of the first motion and the second motion.

4. The method of claim 3 further comprising imparting a second periodic motion along a third direction on each of the first mass and the second mass, wherein the third direction and the first direction are substantially orthogonal.

5. The method of claim 4 wherein the third direction is the second direction.

6. The method of claim 4 wherein the third direction is aligned with a third axis, and wherein the first axis, the second axis, and the third axis are mutually orthogonal.

7. The method of claim 1 further comprising:
providing a third cantilever beam comprising a third mass, a third attachment point, and a third cantilever orientation, wherein the third mass has a third center of mass that is coplanar with the first plane, and wherein the third attachment point is coplanar with the second plane, and wherein the third cantilever orientation forms a third angle with a third direction that is aligned with a third axis, and wherein the third angle is between 90 degrees and 270 degrees, and further wherein the first axis, the second axis, and the third axis are mutually orthogonal;
providing a fourth cantilever beam comprising a fourth mass, a fourth attachment point, and a fourth cantilever orientation, wherein the fourth mass has a fourth center of mass that is coplanar with the first plane, and wherein the fourth attachment point is coplanar with the second plane, and further wherein the fourth cantilever orientation and the third direction form a fourth angle that is between −90 degrees and 90 degrees;
sensing a third motion of the third mass along the first direction; and
sensing a fourth motion of the fourth mass along the first direction.

8. The method of claim 7 further comprising providing the first cantilever beam, the second cantilever beam, the third cantilever beam and the fourth cantilever beam such that:
the first angle is approximately 180 degrees;
the second angle is approximately zero degrees;
the third angle is approximately 180 degrees; and
the fourth angle is approximately zero degrees.

9. The method of claim 7 further comprising:
imparting the first periodic motion on each of the third mass, and the fourth mass; and
comparing the third motion and the fourth motion.

10. The method of claim 9 further comprising:
determining the frequency and phase of the first motion;
determining the frequency and phase of the second motion;
determining the frequency and phase of the third motion;
determining the frequency and phase of the fourth motion;
comparing at least one of the frequency and phase of the first motion and the second motion; and
comparing at least one of the frequency and phase of the third motion and the fourth motion.

11. The method of claim 10 further comprising providing an output signal that is based on at least one of (1) a comparison of the first motion and the second motion and (2) a comparison of the third motion and the fourth motion.

12. An apparatus comprising:
a first cantilever beam comprising a first mass, a first attachment point, and a first cantilever orientation, wherein the first mass has a first center of mass that is coplanar with a first plane, and wherein the first attachment point is coplanar with a second plane, and wherein the first cantilever orientation forms a first angle with a first direction that is aligned with a first axis that is orthogonal to a second axis, and further wherein the first angle is between 90 degrees and 270 degrees;
a second cantilever beam comprising a second mass, a second attachment point, and a second cantilever orientation, wherein the second mass has a second center of mass that is coplanar with the first plane, and wherein the second attachment point is coplanar with the second plane, and further wherein the second cantilever orientation and the first direction form a second angle that is between −90 degrees and 90 degrees;
a first sensor for sensing motion of the first mass along a second direction that is aligned with the second axis;
a second sensor for sensing motion of the second mass along the second direction; and
a first linear actuator for inducing a first periodic motion of the first mass and the second mass along the second direction;
wherein the first plane is orthogonal to the second axis;
wherein the second plane is orthogonal to the second axis; and
wherein the first plane and the second plane are displaced on the second axis.

13. The apparatus of claim 12 wherein the first angle is equal to 180 degrees and the second angle is equal to zero degrees.

14. The apparatus of claim 12 further comprising:
a third cantilever beam comprising a third mass, a third attachment point, and a third cantilever orientation, wherein the third mass has a third center of mass that is coplanar with the first plane, and wherein the third attachment point is coplanar with the second plane, and wherein the third cantilever orientation forms a third angle with a third direction that is aligned with a third axis, and wherein the third angle is between 90 degrees and 270 degrees, and further wherein the first axis, the second axis, and the third axis are mutually orthogonal;
a fourth cantilever beam comprising a fourth mass, a fourth attachment point, and a fourth cantilever orientation, wherein the fourth mass has a fourth center of mass that is coplanar with the first plane, and wherein the fourth attachment point is coplanar with the second plane, and further wherein the fourth cantilever orientation and the third direction form a fourth angle that is between −90 degrees and 90 degrees;
a third sensor for sensing motion of the third mass along the second direction; and
a fourth sensor for sensing motion of the fourth mass along the second direction.

15. The apparatus of claim 14 wherein the first linear actuator induces the first periodic motion on the third mass and the fourth mass along the second direction.

16. The apparatus of claim 15 further comprising a second linear actuator for inducing a second periodic motion of the first mass, the second mass, the third mass, and the fourth mass along a fourth direction that is orthogonal to the second axis.

17. The apparatus of claim 16 wherein the fourth direction is aligned with one of the first axis and the third axis.

18. An apparatus comprising:
a first cantilever beam comprising a first mass, wherein the first cantilever beam has a first cantilever orientation that is substantially aligned with a first axis, and wherein the first cantilever beam comprises a first physical adaptation for enabling a first acceleration that is aligned with the first axis to induce a first force on the first mass, and wherein the first force is directed positively in a second direction that is substantially aligned with a second axis that is orthogonal to the first axis;

a second cantilever beam comprising a second mass, wherein the second cantilever beam has a second cantilever orientation that is substantially aligned with the first axis, and wherein the second cantilever beam comprises a second physical adaptation for enabling the first acceleration to induce a second force on the second mass, and wherein the second force is directed negatively in the second direction;

a first linear actuator for inducing a first periodic motion of the first mass and the second mass along the second direction;

a first sensor for sensing a first motion of the first mass, wherein the first motion is directed along the second direction; and a second sensor for sensing a second motion of the second mass, wherein the second motion is directed along the second direction.

19. The apparatus of claim 18 further comprising:

a third cantilever beam comprising a third mass, wherein the third cantilever beam has a third cantilever orientation that is substantially aligned with a third axis, and wherein the third cantilever beam comprises a third physical adaptation for enabling a second acceleration that is aligned with the third axis to induce a third force on the third mass, and wherein the third force is directed positively in the second direction;

a fourth cantilever beam comprising a fourth mass, wherein the fourth cantilever beam has a fourth cantilever orientation that is substantially aligned with the third axis, and wherein the fourth cantilever beam comprises a fourth physical adaptation for enabling the second acceleration to induce a fourth force on the fourth mass, and wherein the fourth force is directed negatively in the second direction;

a third sensor for sensing motion of the third mass, wherein the third motion is directed along the second direction; and a fourth sensor for sensing motion of the fourth mass, wherein the fourth motion is directed along the second direction.

20. The apparatus of claim 19 further comprising:

a processor;

wherein the first linear actuator further induces the first periodic motion on the third mass and the fourth mass along the second direction; and the processor is dimensioned and arranged to provide at least one of:
 (a) a first signal based on a comparison of the first motion and the second motion;
 (b) a second signal based on a comparison of the third motion and the fourth motion;
 (c) a third signal based on a comparison of the first motion and the third motion;
 (d) a fourth signal based on a comparison of the first motion and the fourth motion;
 (e) a fifth signal based on a comparison of the second motion and the third motion; and
 (f) a sixth signal based on a comparison of the second motion and the fourth motion.

21. The apparatus of claim 20 further comprising:

a second linear actuator for inducing a second periodic motion of the first mass and the second mass along a direction that is substantially orthogonal to the second axis.

22. The apparatus of claim 18:

wherein the first cantilever has a first stiffness in a first plane that is orthogonal to the second direction and a second stiffness along the second direction, and wherein the first stiffness is higher than the second stiffness; and wherein the second cantilever has a third stiffness in a second plane that is orthogonal to the second direction and a fourth stiffness along the second direction, and wherein the third stiffness is higher than the fourth stiffness.

* * * * *